(12) United States Patent
Yilmaz

(10) Patent No.: US 8,797,290 B2
(45) Date of Patent: Aug. 5, 2014

(54) SENSE ELECTRODE SPINE INTERPOLATION

(75) Inventor: Esat Yilmaz, Chandler's Ford (GB)

(73) Assignee: Atmel Corporation, San Jose, CA (US)

( * ) Notice: Subject to any disclaimer, the term of this patent is extended or adjusted under 35 U.S.C. 154(b) by 456 days.

(21) Appl. No.: 12/604,174

(22) Filed: Oct. 22, 2009

(65) Prior Publication Data

US 2011/0096015 A1 Apr. 28, 2011

(51) Int. Cl.
| | |
|---|---|
| G06F 3/045 | (2006.01) |
| G06F 3/041 | (2006.01) |
| G06K 11/06 | (2006.01) |
| G08C 21/00 | (2006.01) |
| G06F 3/044 | (2006.01) |
| G01R 27/26 | (2006.01) |
| G09G 5/00 | (2006.01) |

(52) U.S. Cl.
USPC ............... 345/174; 178/18.03; 178/18.06; 324/658; 324/679; 324/686; 345/173; 345/606

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2007/0062739 A1* | 3/2007 | Philipp et al. | 178/18.06 |
| 2007/0074914 A1* | 4/2007 | Geaghan et al. | 178/18.06 |
| 2008/0264699 A1* | 10/2008 | Chang et al. | 178/18.01 |
| 2009/0194344 A1* | 8/2009 | Harley et al. | 178/18.06 |
| 2009/0315854 A1 | 12/2009 | Matsuo | |
| 2010/0252335 A1* | 10/2010 | Orsley | 178/18.03 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

| | | |
|---|---|---|
| WO | WO 2009/013469 A1 | 1/2009 |
| WO | WO 2009027629 A1 * | 3/2009 |
| WO | WO 2012/129247 | 9/2012 |

OTHER PUBLICATIONS

U.S. Appl. No. 61/454,936, Mar. 21, 2011, Myers.
U.S. Appl. No. 61/454,950, Mar. 21, 2011, Lynch.
U.S. Appl. No. 61/454,894, Mar. 21, 2011, Rothkopf.

* cited by examiner

*Primary Examiner* — Alexander S Beck
*Assistant Examiner* — Kirk Hermann
(74) *Attorney, Agent, or Firm* — Baker Botts LLP

(57) ABSTRACT

An electrode layout for a touchscreen includes multiple sense electrodes. Each sense electrode has multiple spines coupled to each other, including a main spine and at least one spaced apart interpolation spine running in the same direction. The interpolation spine of one sense electrode is positioned adjacent a spaced apart interpolation spine of a neighboring sense electrode to provide interpolated sense electrodes.

23 Claims, 5 Drawing Sheets

SENSE ELECTRODE SPINE INTERPOLATION

BACKGROUND

Touchscreen displays are able to detect a touch such as by a finger or stylus within an active or display area. Use of a touchscreen as part of a display enables a user to interact with an electronic application by touching the touchscreen. The display may present images to the user. Such images may include user interface constructs such as different buttons, images, or other regions that can be selected, manipulated, or actuated by touch. Touchscreens can therefore provide an effective user interface for cell phones, GPS devices, personal digital assistants (PDAs), computers, ATM machines, and other such devices.

Touchscreens use various technologies to sense touch from a finger or stylus, such as resistive, capacitive, infrared, and acoustic sensors. In one type of capacitive sensor based touchscreen, a touch changes a capacitance at a node in an array of electrodes overlaying the display device. Capacitive touchscreens often use one or more layers of transverse electrodes, drive electrodes and sense electrodes, separated by a dielectric. The intersections of the transverse electrodes form the nodes. Electronics may be used to drive a series of pulses of current on the drive electrodes. Charge at the nodes accumulating during each pulse is then captured, and used to determine the location of a touch or touches.

Transparent conductors such as indium tin oxide (ITO) or transparent conductive polymers may be used to form the electrodes. Some layouts of electrodes utilize a flooded type pattern of drive electrodes to shield the sense electrodes from electric field interference from an underlying display, such as a liquid crystal display (LCD). The flooded type pattern uses solid fill closely spaced adjacent drive electrode patterns and is formed in a layer between the sense electrodes and display.

In some prior touchscreen devices, the layer of electrodes closest to the LCD, are the drive electrodes, and run in a first direction. The sense electrodes included spines that run transverse to the drive electrodes, and also include cross bars that run in the same direction as the drive electrodes. The cross bars may be used to increase the distance between the sense electrodes such that larger touchscreens may be provided without increasing the number of sense electrodes. However, the cross bars add resistance and parasitic capacitance, as well as complexity to the electrode layout.

SUMMARY

An electrode layout for a touchscreen includes multiple sense electrodes. Each sense electrode has multiple spines coupled to each other, including a main spine and at least one spaced apart interpolation spine running in the same direction. The interpolation spine of one sense electrode is positioned adjacent a spaced apart interpolation spine of a neighboring sense electrode to provide interpolated sense electrodes.

DETAILED DESCRIPTION

Various embodiments are described that utilize sense electrode spine interpolation. A sense electrode may be formed of a main spine and multiple interpolation spines that are electrically coupled. A main spine of a current sense electrode may be coupled to one or more spaced apart interpolation spines, with adjacent sense electrode's main spine having at least one spaced apart interpolation spines directly adjacent to at least one of the current electrode's interpolation spines to provide interpolated sense electrodes. The sense electrodes may be coupled to sense lines on one or both ends of the sense electrodes. The embodiments may be used in designs with one or more electrode layers.

Figure 1:
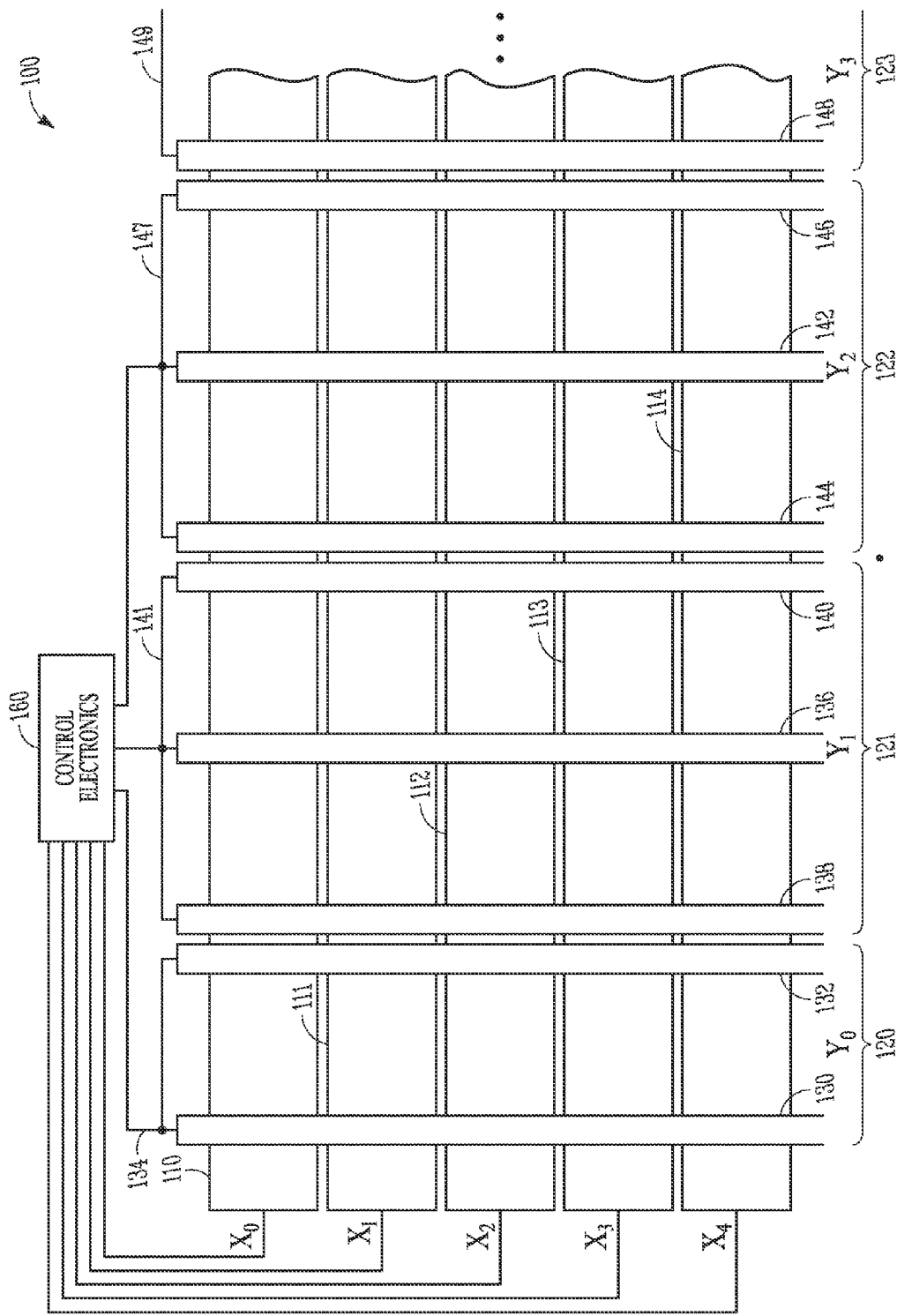
FIG. 1 is a schematic representation of an electrode pattern having sense electrode spine interpolation according to an example embodiment.

FIG. 1 is a schematic representation of a partial electrode pattern 100 having sense electrode spine interpolation according to an example embodiment. A plurality of longitudinal adjacent drive electrodes are indicated at 110, 111, 112, 113 and 114. The drive electrodes are identified as $X_0, X_1, X_2, X_3$, and $X_4$, and may be formed over a display device such as a liquid crystal display (LCD) in one embodiment. The drive electrodes may be formed of indium tin oxide (ITO) or other transparent conductor such as transparent conductive polymers over a transparent substrate such as glass. The layout of drive electrodes may utilize a flooded type pattern of drive electrodes to shield the sense electrodes from electric field interference from the underlying display. The flooded type pattern may use solid fill drive electrodes, illustrated as bar shapes.

Multiple interpolated sense electrodes 120, 121, 122, and 123 are shown running generally transverse to the drive electrodes. The sense electrodes are identified as $Y_0, Y_1, Y_2$, and $Y_3$ respectively. Sense electrode 120 includes a main spine 130 and an interpolation spine 132 that is spaced apart from and electrically coupled to the main spine 130 via a sense line 134. Sense lines may be formed of highly conductive material such as copper or other metal. Sense electrode 121 is a neighboring sense electrode that is adjacent sense electrode 120, and includes a main spine 136 and two interpolation spines 138 and 140 that are spaced apart on opposite sides of the main spine 136 and are coupled by a sense line 141. Sense electrode 122 also includes a main spine 142 and two spaced apart interpolation spines 144 and 146 that are coupled by a sense line 147. An interpolation spine 148 of sense electrode 123 is also shown that is coupled to a further main and interpolation spine (not shown) by a sense line 149.

Interpolation spine 132 of sense electrode 120 and interpolation spine 138 of sense electrode 121 are disposed adjacent to each other, and therefore shield each other's opposing edges and substantially stop fringe electric fields forming between the opposing edges and the drive electrodes, providing an interpolation of the sense electrodes without increasing the number of sense lines to be coupled to control electronics 160. The drive electrodes may also be coupled to control electronics 160 via drive lines. In various embodiments, the control electronics may include a microcontroller and circuitry operating under control of the microcontroller to provide pulses to the drive electrodes and to sense accumulated charge transferred from the sense electrodes representative of touches.

Similarly, interpolation spine 140 of sense electrode 121 is positioned directly adjacent interpolation spine 144 of sense electrode 122. Interpolation spine 146 is adjacent interpolation spine 148. This pattern of adjacent interpolation spines may continue over the surface of touchscreen 100, with the first and final spines in the pattern being main spines. Further drive electrodes may also be formed to continue over the surface of touchscreen 100.

In some embodiments, both main and interpolation spines may have the same width, and the spacing between main spines in adjacent sense electrodes may be up to approximately 10 mm or at least 10 mm as compared to 6 mm or less in prior sense electrode patterns without crossbars. The spacing between secondary spines and corresponding main spines may be at least 4 mm or less in some embodiments. The ability to obtain such spacing without the use of cross bars may provide several benefits, such as a reduced sense electrode resistance, reduced parasitic capacitance, and fewer sense lines in some embodiments. The lack of cross bars may also reduce the visibility of the electrode pattern and may enable thinner constructions.

Figure 2:
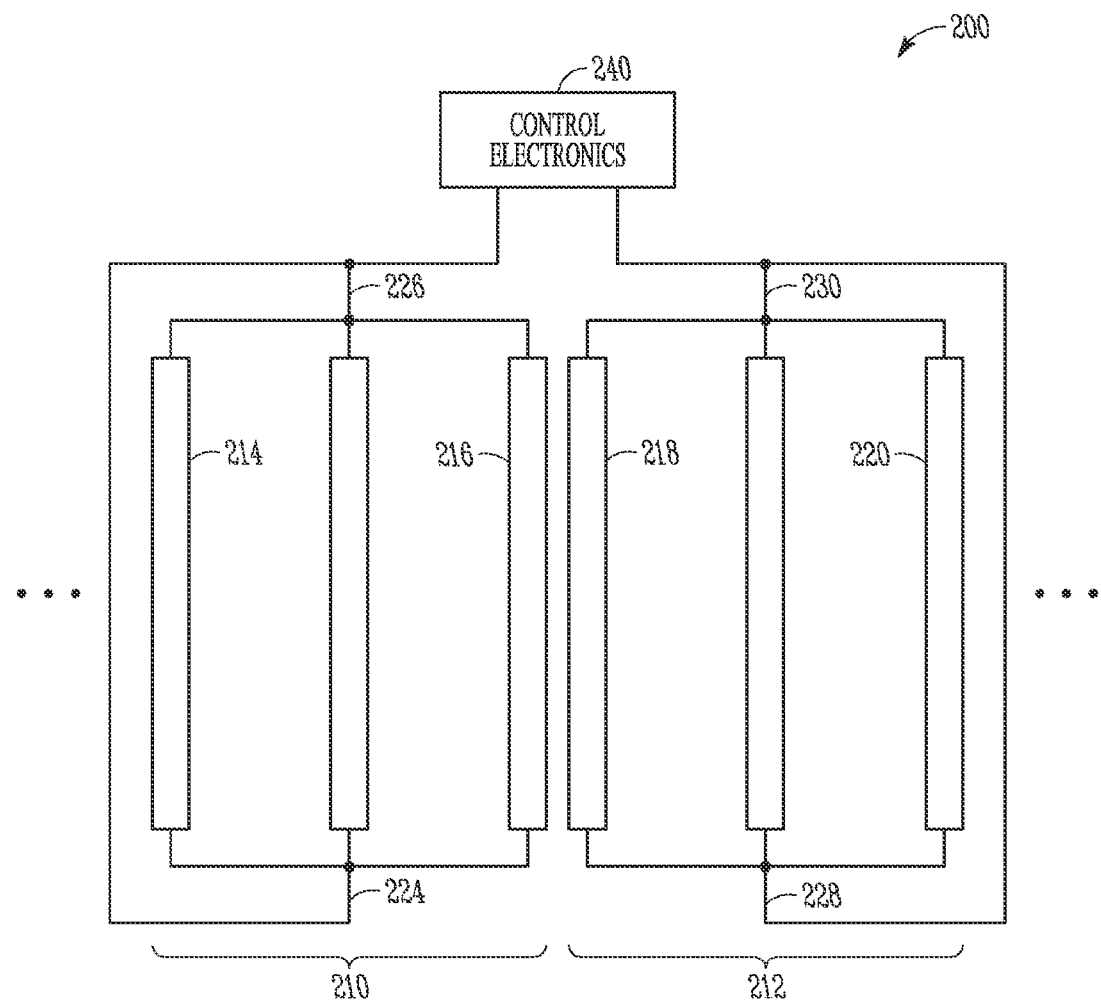
FIG. 2 is a schematic representation of an alternative sense electrode pattern having sense electrode spine interpolation according to an example embodiment.

FIG. 2 is a schematic representation of an alternative sense electrode pattern 200 having sense electrode spine interpolation according to an example embodiment. Two sense electrodes 210 and 212 are shown, each having pairs of interpolation electrodes 214, 216 and 218 and 220 respectively. The sense electrodes 210 and 212 are double connected as indicated by pairs of sense lines 224, 226 and 228, 230 for the respective sense electrodes. The sense lines couple the sense electrodes to control electronics 240. This results in a further decrease in the resistance of the sense electrodes. In one embodiment, the sense lines are routed on one side of the electrode pattern 200. The drive electrodes and drive lines are not shown, but may be routed on either side of electrode pattern 200 in various embodiments.

Figure 3:
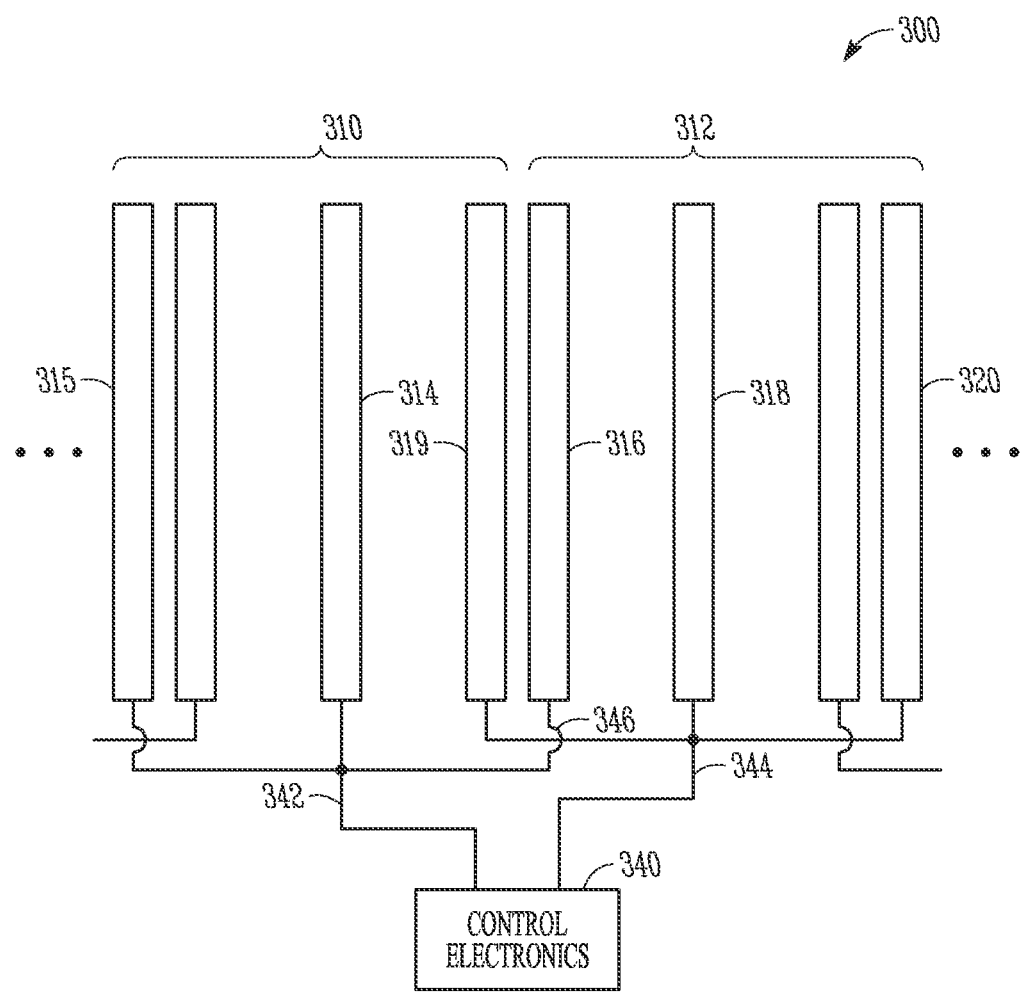
FIG. 3 is a partial schematic representation of a still further alternative sense electrode pattern having sense electrode spine interpolation according to an example embodiment.

FIG. 3 is a schematic representation of a still further alternative partial sense electrode pattern 300 having sense electrode spine interpolation according to an example embodiment. Only two sense electrodes 310 and 312 are shown for simplicity, but it is understood that there may be further sense electrodes on both sides of the illustrated sense electrodes, along with corresponding drive electrodes and drive lines. Sense electrode 310 includes a main spine 314 and two interpolation spines 315 and 316. Sense electrode 312 includes a main spine 318 and interpolation spines 319 and 320. In electrode pattern 300, adjacent interpolation spines 316 and 319 are flipped, such that interpolation spine 319 of sense electrode 312 is closer to main spine 314 of sense electrode 310 than it is to main spine 318 of sense electrode 312. Similarly, interpolation spine 316 of sense electrode 310 is closer to the main spine 318 of sense electrode 312. The interpolation spines operate in the same manner as the interpolation spines of previous embodiments, shielding each other's opposing edges and substantially stopping fringe electric fields forming between the opposing edges and the drive electrodes. There may be small amounts of fringe electric fields between the opposing edges that are not a significant factor.

In one embodiment, sense electrode 310 is coupled to control electronics 340 by a sense line 342, and sense electrode 312 is coupled to control electronics 340 by a sense line 344. A sense line crossover indicated at 346 may be used to facilitate routing of the sense lines. In further embodiments, both ends of the sense electrodes may be coupled by sense lines to control electronics 340 in the same manner as in pattern 200 in FIG. 2. In various embodiments, the pattern ends with a main spine of a sense electrode to enhance linearity of response.

Figure 4:
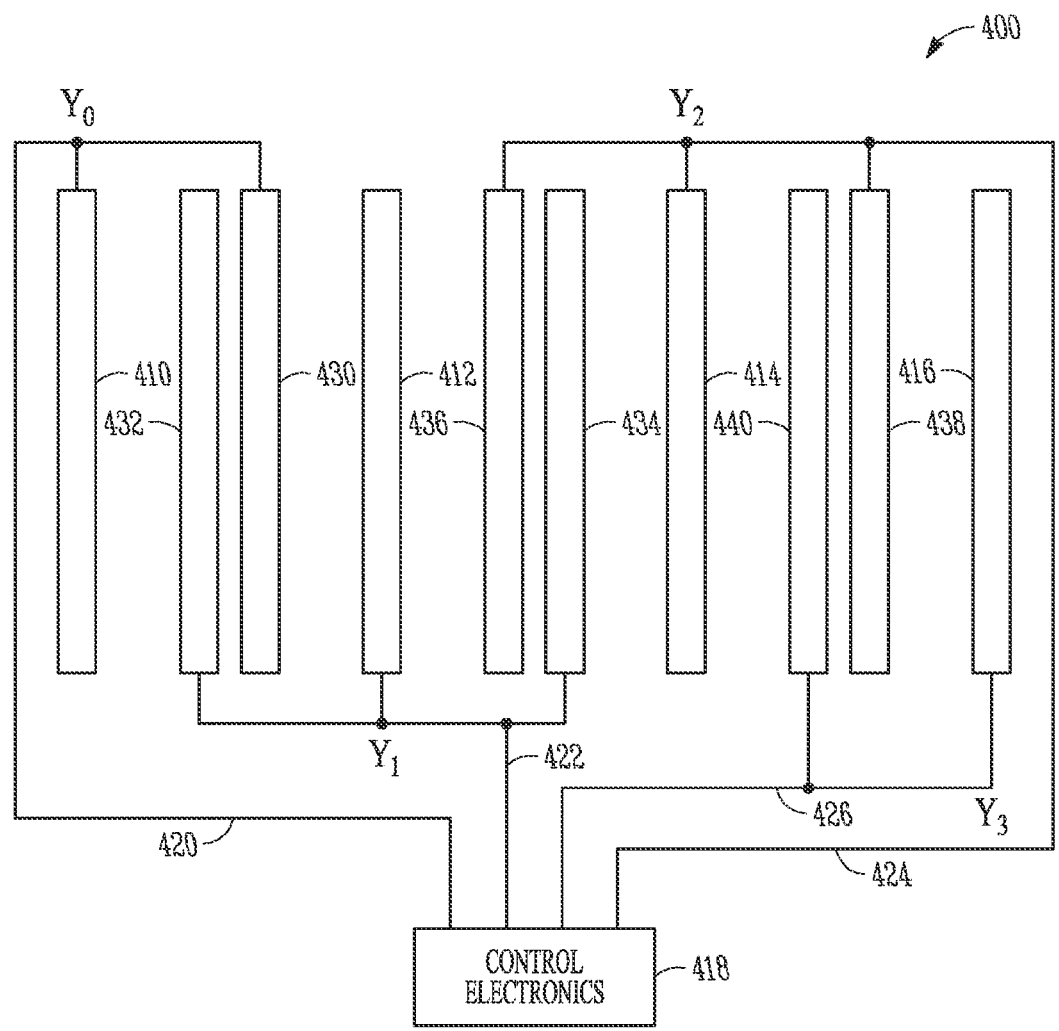
FIG. 4 is a schematic representation of the alternative sense electrode pattern with no crossover conductors according to an example embodiment.

FIG. 4 is a schematic representation of the alternative sense electrode pattern 400 with no crossover conductors according to an example embodiment. In further embodiments, alternate sense electrodes may have sense lines on alternating ends of the sense electrodes, alleviating the need for crossovers. As seen in pattern 400, four main spines 410, 412, 414, and 416 may be coupled to control electronics 418 by sense lines 420, 422, 424, and 426 respectively. Sense line 420 is coupled on a first end of the pattern 400 to at least one interpolation spine 430, and is also coupled to main spine 410. Sense line 422 is coupled to main spine 412 and interpolation spines 432, 434 on a second end of pattern 400. Similarly, sense line 424 is coupled to main spine 414 and interpolation spines 436 and 438 on the first end of the pattern 400. Sense line 426 is coupled to main spine 416 and interpolation spine 440 on the second end of the pattern. As in the electrode pattern in FIG. 3, the adjacent interpolation spines are flipped in this embodiment. The alternate end connection of the sense lines to electrodes provides the ability to connect the electrodes to the control electronics 418 without the use of crossover lines.

Figure 5:
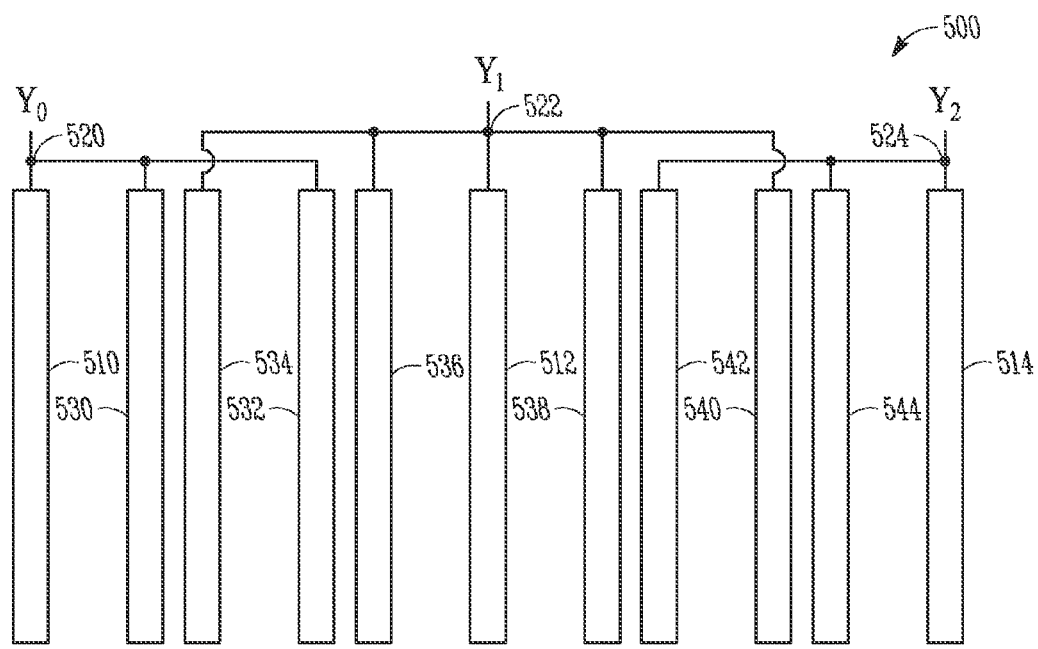
FIG. 5 is a schematic representation of a still further alternative sense electrode pattern having multiple sense electrode interpolation spines according to an example embodiment.

FIG. 5 is a schematic representation of a still further alternative sense electrode pattern 500 having multiple sense electrode spine interpolations according to an example embodiment. In pattern 500, three main spines 510, 512, and 514 may be coupled to control electronics (not shown) by sense lines 520, 522, and 524 respectively. Sense line 520 is coupled on a first end of the pattern 500 to main spine 510 and at least two interpolation spines 530 and 532. Sense line 522 is coupled to main spine 512 and at least two interpolation spines 534, 536 on one side and at least two interpolation spines 538 and 540 on the other side of main spine 512. Similarly, sense line 524 is coupled to main spine 514 and at least two interpolation spines 542, 544 on one side of main spine 514. In one embodiment, at least two sets of adjacent interpolation spines are disposed between each main spine, such as interpolation spines 530, 534 and 532, 536 between main spines 510 and 512, and interpolation spines 538, 542 and 540, 544 between main spines 512 and 514.

Figure 6:
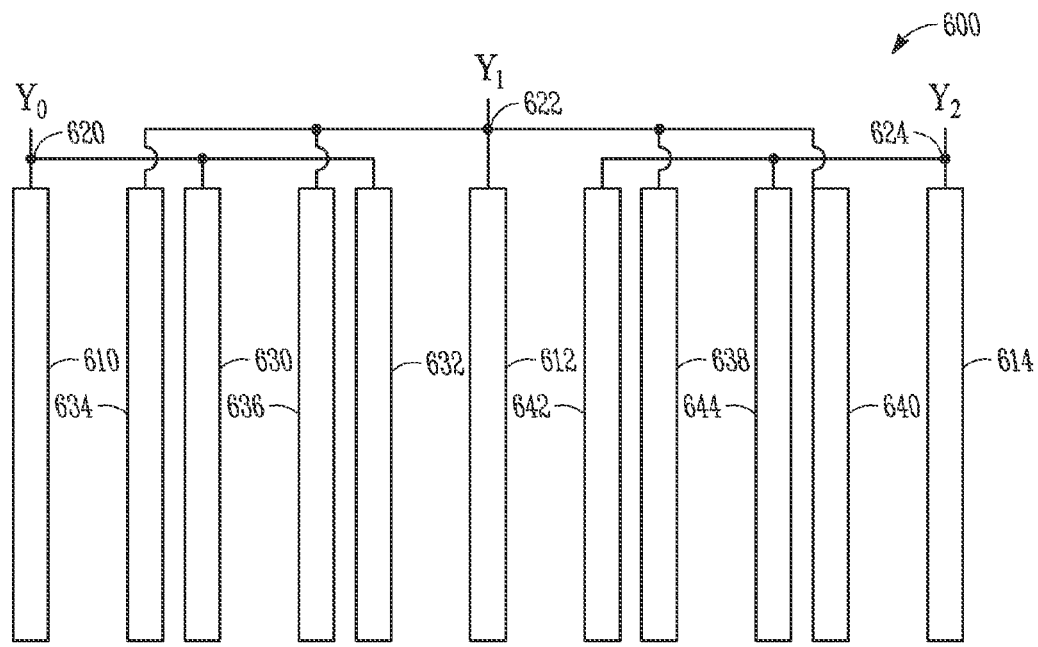
FIG. 6 is a schematic representation of a still further alternative sense electrode pattern having multiple sense electrode interpolation spines according to an example embodiment.

FIG. 6 is a schematic representation of a still further alternative sense electrode pattern 600 having multiple sense electrode spine interpolations according to an example embodiment. In pattern 600, three main spines 610, 612, and 614 may be coupled to control electronics (not shown) by sense lines 620, 622, and 624 respectively. Sense line 620 is coupled on a first end of the pattern 600 to main spine 610 and at least two interpolation spines 630 and 632. Sense line 622 is coupled to main spine 612 and at least two interpolation spines 634, 636 on one side and at least two interpolation spines 638 and 640 on the other side of main spine 612. Similarly, sense line 624 is coupled to main spine 614 and at least two interpolation spines 642, 644 on one side of main spine 612. In one embodiment, at least two sets of adjacent interpolation spines are disposed between each main spine, such as interpolation spines 630, 634 and 632, 636 between main spines 610 and 612, and interpolation spines 638, 642 and 640, 644 between main spines 612 and 614. In this embodiment, the interpolation spines are flipped in a manner similar to that of pattern 300 in FIG. 3.

The invention claimed is:

1. A device comprising:
   a plurality of drive electrodes extending in a first direction;
   a first sense electrode extending in a second direction, the first sense electrode comprising:
      a first main spine extending in the second direction and adapted to be electrically coupled to control electronics by a first sense line; and
      a first plurality of interpolation spines extending in the second direction, the first plurality of interpolation spines being electrically coupled to the first main spine by the first sense line, each interpolation spine of the first plurality of interpolation spines overlapping multiple drive electrodes of the plurality of drive electrodes;
   a second sense electrode extending in the second direction and located adjacent to the first sense electrode, the second sense electrode comprising:
      a second main spine extending in the second direction and adapted to be electrically coupled to the control electronics by a second sense line; and
      a second plurality of interpolation spines extending in the second direction, the second plurality of interpolation spines being electrically coupled to the second main spine by the second sense line;
   wherein:
      none of the first plurality of interpolation spines of the first sense electrode is located between any one of the second plurality of interpolation spines and the second main spine; and
      none of the second plurality of interpolation spines of the second sense electrode is located between any one of the first plurality of interpolation spines and the first main spine.

2. The device of claim 1 wherein:
   each of the first plurality of interpolation spines generate a smaller change in capacitance on touch than the first main spine; and
   each of the second plurality of interpolation spines generate a smaller change in capacitance on touch than the second main spine.

3. The device of claim 1 wherein adjacent ones of the first plurality of interpolation spines and the second plurality of interpolation spines shield each other's opposing edges and substantially stop fringe electric fields forming between these opposing edges and the drive electrodes.

4. The device of claim 1 wherein the first and second main spines are separated by at least 10 mm.

5. The device of claim 4 wherein:
   each of the first plurality of interpolation spines is separated from the first main spine by at least 4 mm; and
   each of the second plurality of interpolation spines is separated from the second main spine by at least 4 mm.

6. The device of claim 1 wherein:
   the first sense line is located at a first end of the first sense electrode;
   the first plurality of interpolation spines are electrically coupled to the first main spine by another sense line located at second end of the first sense electrode;
   the second sense line is located at a first end of the second sense electrode; and
   the second plurality of interpolation spines are electrically coupled to the second main spine by another sense located at a second end of the second sense electrode.

7. The device of claim 6 wherein the sense lines result in reduced electrode resistance.

8. The device of claim 1 wherein the first plurality of interpolation spines are electrically coupled by the first sense line to the first main spine at an end of the first sense electrode opposite an end of the second sense electrode at which the second plurality of interpolation spines are electrically coupled by the second sense line to the second main spine to avoid crossovers.

9. A device comprising:
   a drive electrode layer comprising a plurality of drive electrodes running in a first direction;
   a dielectric layer; and
   a sense electrode layer separated from the drive electrode layer by the dielectric layer, the sense electrode layer comprising a first sense electrode and a second sense electrode each wherein:
      the first sense electrode comprises:
         a first main spine extending in the second direction and adapted to be coupled to control electronics by a first sense line; and
         a first plurality of interpolation spines extending in the second direction, the first plurality of interpolation spines being electrically coupled to the first main spine by the first sense line, each interpolation spine of the first plurality of interpolation spines overlapping multiple drive electrodes of the plurality of drive electrodes;
      the second sense electrode comprises:
         a second main spine extending in the second direction and adapted to e electrically coupled to the control electronics by a second sense line; and
         a second plurality of interpolation spines extending in the second direction, the second plurality of interpolation spines being electrically coupled to the second main spine by the second sense line;
      none of the first plurality of interpolation spines of the first sense electrode is located between any one of the second plurality of interpolation spines and the second main spine; and
      none of the second plurality of interpolation spines of the second sense electrode is located between any one of the first plurality of interpolation spines and the first main spine.

10. The device of claim 9 wherein:
    each of the first plurality of interpolation spines generate a smaller change in capacitance on touch than the first main spine; and
    each of the second plurality of interpolation spines generate a smaller change in capacitance on touch than the second main spine.

11. The device of claim 9 wherein adjacent ones of the first plurality of interpolation spines and the second plurality of interpolation spines shield each other's opposing edges and substantially stop fringe electric fields forming between these opposing edges and the drive electrodes.

12. The device of claim 9 wherein the first and second main spines are separated by at least 10 mm.

13. The device of claim 12 wherein:
    each of the first plurality of interpolation spines is separated from the first main spine by at least 4 mm; and
    each of the second plurality of interpolation spines is separated from the second main spine by at least 4 mm.

14. The device of claim 9 wherein:
    the first sense line is located at a first end of the first sense electrode;
    the first plurality of interpolation spines are electrically coupled to the first main spine by another sense line located at a second end of the first sense electrode;

the second sense line is located at a first end of the second sense electrode; and the second plurality of interpolation spines are electrically coupled to the second main spine by another sense located at a second end of the second sense electrode.

15. The device of claim 14 wherein the sense lines result in reduced resistance in the particular sense electrode.

16. The device of claim 9 wherein the first plurality of interpolation spines are electrically coupled by the first sense line to the first main spine at an end of the first sense electrode opposite an end of the second sense electrode at which the second plurality of interpolation spines are electrically coupled by the second sense line to the second main spine to avoid crossovers.

17. A method comprising:
forming a plurality of drive electrodes over a display device, the drive electrodes arranged in a solid fill pattern and running in a first direction;
forming first and second sense electrodes separated from the plurality of drive electrodes, the first and second sense electrodes running in a second direction transverse to the first direction, wherein:
the first sense electrode comprises:
a first main spine extending in the second direction and adapted to be electrically coupled to control electronics by a first sense line; and
a first plurality of interpolation spines extending in the second direction, the first plurality of interpolation spines being electrically coupled to the first main spine by the first sense line, each interpolation spine of the first plurality of interpolation spines overlapping multiple drive electrodes of the plurality of drive electrodes;
the second sense electrode comprises:
a second main spine extending in the second direction and adapted to be electrically coupled to the control electronics by a second sense line; and
a second plurality of interpolation spines extending in the second direction, the second plurality of interpolation spines being electrically coupled to the second main spine by the second sense line;
none of the first plurality of interpolation spines of the first sense electrode is located between any one of the second plurality of interpolation spines and the second main spine; and
none of the second plurality of interpolation spines of the second sense electrode is located between any one of the first plurality of interpolation spines and the first main spine.

18. The method of claim 17 wherein forming the plurality of drive electrodes includes using a transparent conductive material.

19. The method of claim 18 wherein the conductive material is indium tin oxide.

20. The method of claim 17 wherein forming the first and second sense electrodes includes separating the first main spine from the second main spine by at least 10 mm.

21. The device of claim 1 wherein the drive electrodes are in the same layer as the first and second sense electrodes.

22. The device of claim 1 wherein:
the drive electrodes are located in a drive electrode layer;
the first and second sense electrodes are positioned in a sense electrode layer; and
the drive electrode layer and the sense electrode layer are separated by a dielectric layer.

23. The device of claim 1, further comprising the control electronics.

* * * * *

UNITED STATES PATENT AND TRADEMARK OFFICE
CERTIFICATE OF CORRECTION

PATENT NO. : 8,797,290 B2  
APPLICATION NO. : 12/604174  
DATED : August 5, 2014  
INVENTOR(S) : Esat Yilmaz Page 1 of 1

It is certified that error appears in the above-identified patent and that said Letters Patent is hereby corrected as shown below:

On the Title Page, Item (56):

FOREIGN PATENT DOCUMENTS:

At the bottom of the list please insert --CN   CN   1826628 A   8/2006--.

OTHER PUBLICATIONS:

At the bottom of the list please insert --First Office Action and English translation for Chinese Patent Application 201010520061.2, April 16, 2014.--.

Signed and Sealed this  
Twenty-fourth Day of March, 2015

Michelle K. Lee  
*Director of the United States Patent and Trademark Office*